US012587108B2

(12) United States Patent
Hatakeyama et al.

(10) Patent No.: US 12,587,108 B2
(45) Date of Patent: Mar. 24, 2026

(54) POWER CONVERTING APPARATUS, HEAT PUMP APPARATUS, AND AIR CONDITIONER

(71) Applicant: Mitsubishi Electric Corporation, Tokyo (JP)

(72) Inventors: Kazunori Hatakeyama, Tokyo (JP); Yuji Takayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 18/264,259

(22) PCT Filed: Apr. 19, 2021

(86) PCT No.: PCT/JP2021/015851
§ 371 (c)(1),
(2) Date: Aug. 4, 2023

(87) PCT Pub. No.: WO2022/224300
PCT Pub. Date: Oct. 27, 2022

(65) Prior Publication Data
US 2024/0048066 A1     Feb. 8, 2024

(51) Int. Cl.
| *H02M 7/06* | (2006.01) |
| *F24F 11/88* | (2018.01) |
| *H02P 27/06* | (2006.01) |

(52) U.S. Cl.
CPC .............. *H02M 7/06* (2013.01); *F24F 11/88* (2018.01); *H02P 27/06* (2013.01)

(58) Field of Classification Search
CPC ........ H02M 1/14; H02M 1/0012; H02M 7/00; H02M 7/53871
See application file for complete search history.

(56) References Cited

U.S. PATENT DOCUMENTS

| 4,039,914 A | * | 8/1977 | Steigerwald | .............. H02P 3/22 |
| | | | | 318/762 |
| 2011/0227522 A1 | * | 9/2011 | Shinomoto | ......... H02M 1/4225 |
| | | | | 318/400.29 |

(Continued)

FOREIGN PATENT DOCUMENTS

| CN | 108880371 B | * | 4/2020 | .............. H02P 21/00 |
| EP | 3160031 A1 | | 4/2017 | |

(Continued)

OTHER PUBLICATIONS

International Search Report of the International Searching Authority mailed Jun. 29, 2021 for the corresponding International Application No. PCT/JP2021/015851 (and English translation).

(Continued)

*Primary Examiner* — Meraj A Shaikh
(74) *Attorney, Agent, or Firm* — Posz Law Group, PLC

(57) ABSTRACT

A power converting apparatus includes: a rectifier that rectifies alternating-current power output from an alternating-current power supply; a capacitor provided at an output end of the rectifier; a reactor provided on a path from the alternating-current power supply to the capacitor; a load connected across the capacitor; and a control unit that reduces a charging and discharging current of the capacitor by controlling an operation state of the load such that power pulsation occurs in power to be consumed by the load, wherein a range of an inductance value of the reactor is defined by use of a maximum value of an output voltage of the rectifier, a minimum value of the output voltage of the rectifier, a direct-current component of output power of the load, a number of phases of the alternating-current power supply, and an angular frequency of the alternating-current power supply.

5 Claims, 8 Drawing Sheets

(56)     References Cited

U.S. PATENT DOCUMENTS

| | | | | |
|---|---|---|---|---|
| 2012/0090337 A1* | 4/2012 | Chen ..................... | F25B 49/025 | |
| | | | | 29/890.035 |
| 2013/0193897 A1* | 8/2013 | Iwashita .............. | H02P 27/085 | |
| | | | | 318/503 |
| 2015/0115854 A1 | 4/2015 | Pottebaum et al. | | |
| 2015/0308700 A1* | 10/2015 | Kimura ................ | F24F 5/0096 | |
| | | | | 62/159 |

FOREIGN PATENT DOCUMENTS

| | | | | |
|---|---|---|---|---|
| JP | 2010-088150 A | 4/2010 | | |
| JP | 2012-157242 A | 8/2012 | | |
| JP | 2015-139337 A | 7/2015 | | |
| JP | 2018-207627 A | 12/2018 | | |
| WO | WO-2014122878 A1 * | 8/2014 | ............... | H02P 6/24 |

OTHER PUBLICATIONS

Extended European Search Report mailed May 7, 2024 in corresponding European Patent Application No. 21937799.1.
Office Action mailed Jan. 12, 2026 in connection with corresponding European patent application No. 21937799.1.
Office Action mailed Feb. 11, 2026 in corresponding Indian patent application No. 202327059943.

\* cited by examiner

POWER CONVERTING APPARATUS, HEAT PUMP APPARATUS, AND AIR CONDITIONER

CROSS-REFERENCE TO RELATED APPLICATION

This application is a U.S. National Stage Application of PCT/JP2021/015851 filed on Apr. 19, 2021, the contents of which are incorporated herein by reference.

FIELD

The present disclosure relates to a power converting apparatus that converts alternating-current power into direct-current power, a heat pump apparatus, and an air conditioner.

BACKGROUND

Conventionally, damage due to overvoltage of a circuit element connected to an output bus of a rectifier is prevented while harmonic components in an input power source current are reduced without using a capacitor with a high capacitance. Patent Literature 1 discloses a technique in which a value of a capacitance C [F] of a smoothing capacitor satisfies "$443\times10^{-6}\cdot Pm/Vac^2 \leq C \leq 1829\times10^{-6}\cdot Pm/Vac^2$", where Vac [V] is a power supply voltage of a three-phase alternating-current power supply, and Pm [W] is power to be consumed by a three-phase alternating-current motor.

PATENT LITERATURE

Patent Literature 1: Japanese Patent Application Laid-open No. 2012-157242

According to the conventional technique above, the inverter device of Patent Literature 1 uses a capacitor with a capacitance of 110.8 uF to 457.3 uF when power to be consumed by the three-phase alternating-current motor is 10 kW. Since the inverter device of Patent Literature 1 uses a capacitor with a capacitance lower than that of a generally used capacitor, charging and discharging current of the capacitor, that is, ripple current increases. Therefore, there has been a problem that when an electrolytic capacitor, which is a life-limited component, is used, heat generation increases and this adversely affects the life of the electrolytic capacitor. In the inverter device of Patent Literature 1, it is also possible to use a film capacitor with a high current ripple tolerance so as to increase the life. However, a film capacitor is more expensive than an electrolytic capacitor, so that an increase in cost cannot be avoided.

SUMMARY

The present disclosure has been made in view of the above, and an object of the present disclosure is to obtain a power converting apparatus capable of reducing ripple current of a capacitor and prolonging the life of the capacitor.

In order to solve the above-described problems and achieve the object, a power converting apparatus according to the present disclosure includes: a rectifier that rectifies alternating-current power output from an alternating-current power supply; a capacitor provided at an output end of the rectifier; a reactor provided on a path from the alternating-current power supply to the capacitor; a load connected across the capacitor; and a control unit that reduces a charging and discharging current of the capacitor by controlling an operation state of the load such that power pulsation occurs in power to be consumed by the load. A range of an inductance value of the reactor is defined by use of a maximum value of an output voltage of the rectifier, a minimum value of the output voltage of the rectifier, a direct-current component of output power of the load, a number of phases of the alternating-current power supply, and an angular frequency of the alternating-current power supply.

The power converting apparatus according to the present disclosure has the effect of enabling reduction of ripple current of a capacitor and prolongation of the life of the capacitor.

DETAILED DESCRIPTION

Hereinafter, a power converting apparatus, a heat pump apparatus, and an air conditioner according to embodiments of the present disclosure will be described in detail with reference to the drawings.

First Embodiment

Figure 1:
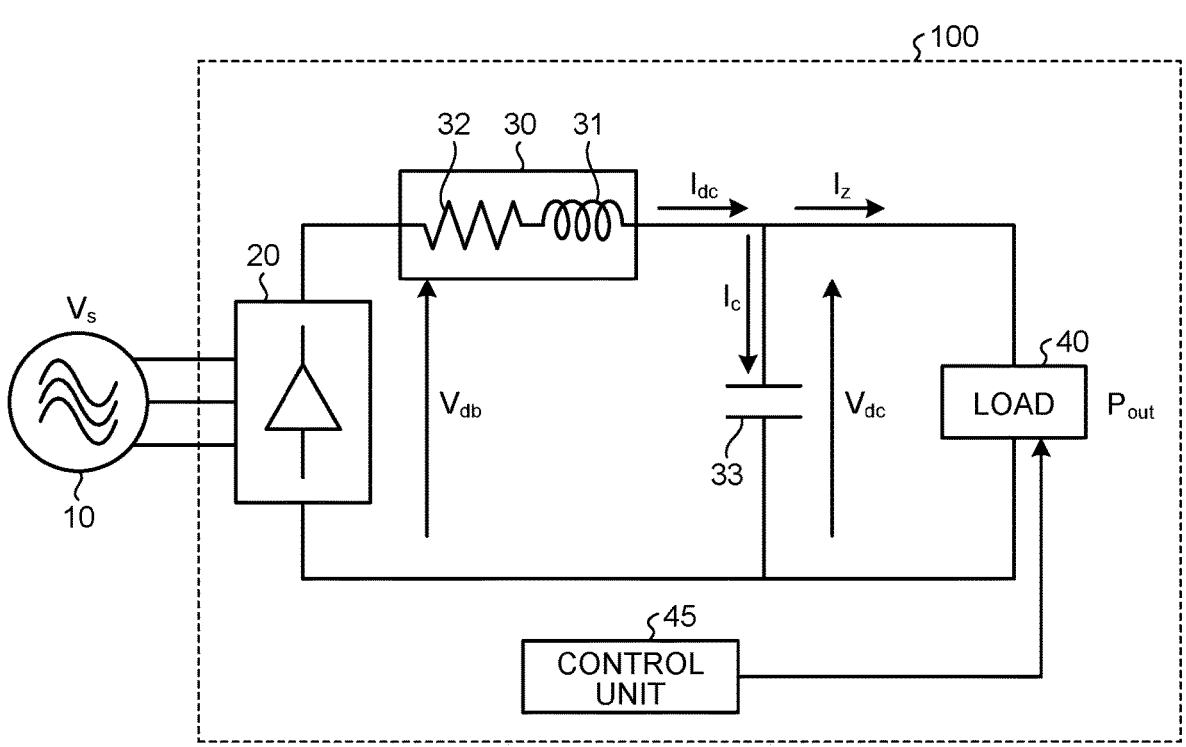
FIG. 1 is a diagram showing a configuration example of a power converting apparatus according to a first embodiment.

FIG. 1 is a diagram showing a configuration example of a power converting apparatus 100 according to a first embodiment. The power converting apparatus 100 is connected to an alternating-current power supply 10, and converts alternating-current power output from the alternating-current power supply 10 into direct-current power. The power converting apparatus 100 includes a rectifier 20, a reactor 30, a capacitor 33, a load 40, and a control unit 45. The reactor 30 includes an inductance component 31 and a resistance component 32.

The alternating-current power supply 10 outputs alternating-current power to the power converting apparatus 100. The alternating-current power supply 10 is described as a three-phase power supply in the example of FIG. 1, but may be a single-phase power supply. In a case where the alternating-current power supply 10 is a single-phase power supply, two wires are provided between the alternating-current power supply 10 and the rectifier 20, and a single-phase rectifier is used as the rectifier 20. A power-supply frequency f of the alternating-current power supply 10 may be 50 Hz or 60 Hz as with a general commercial power supply, or may be another frequency.

The rectifier 20 rectifies the alternating-current power output from the alternating-current power supply 10. The rectifier 20 outputs the rectified power to the capacitor 33 connected to an output end of the rectifier 20. The rectifier 20 is a circuit including a plurality of diodes, but the circuit configuration of the rectifier 20 is not limited thereto.

The reactor 30 is located between and connected to the rectifier 20 and the capacitor 33 in the example of FIG. 1, but may be located between and connected to the alternating-current power supply 10 and the rectifier 20. In a case where the reactor 30 is located between and connected to the rectifier 20 and the alternating-current power supply 10 that is a three-phase power supply, three reactors 30 are required. This is because the reactor 30 is inserted on each line. That is, the reactor 30 is provided on a path from the alternating-current power supply 10 to the capacitor 33.

The capacitor 33 is provided at the output end of the rectifier 20. Note that, in the example of FIG. 1, the capacitor 33 is connected to the output end of the rectifier 20 via the reactor 30.

The load 40 is connected across the capacitor 33. The load 40 is not particularly limited as long as the load 40 is a load using direct-current power. Although not illustrated, it is assumed here, as an example, that the load 40 includes an inverter that converts direct-current power into alternating-current power, and an inductive load such as a motor.

The control unit 45 controls operation of the power converting apparatus 100. Specifically, the control unit 45 reduces charging and discharging current of the capacitor 33 by controlling the operation state of the load 40 such that power pulsation occurs in power to be consumed by the load 40. Note that although not illustrated in FIG. 1, the power converting apparatus 100 includes detection units capable of detecting an output voltage $V_{db}$ of the rectifier 20, a voltage $V_{dc}$ across the capacitor 33, a current $I_c$ flowing through the capacitor 33, a current $I_z$ flowing through the load 40, and the like, and the control unit 45 controls the operation state of the load 40 on the basis of respective results of detection performed by the detection units.

Note that the power converting apparatus 100 can also be applied to a power converting apparatus equipped with a power factor correction circuit, a booster circuit, or the like.

Figure 2:
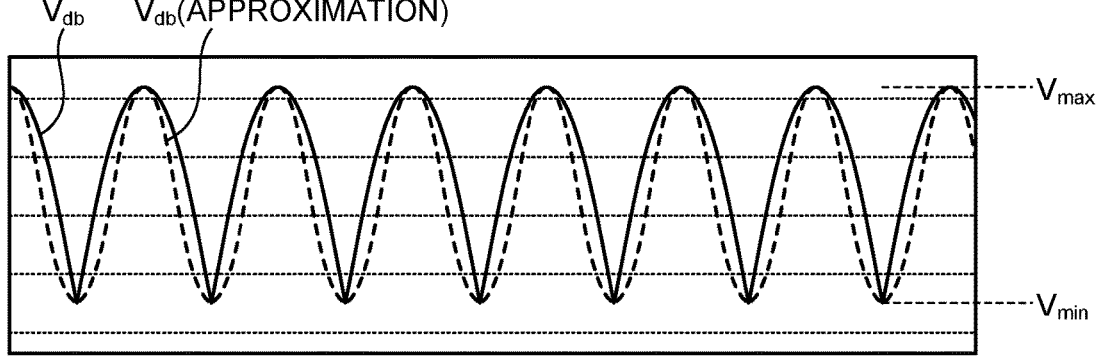
FIG. 2 is a diagram showing an example of an output voltage of a rectifier of the power converting apparatus according to the first embodiment.

FIG. 2 is a diagram showing an example of the output voltage $V_{db}$ of the rectifier 20 of the power converting apparatus 100 according to the first embodiment. In FIG. 2, the horizontal axis represents time and the vertical axis represents voltage. As illustrated in FIG. 2, when the output voltage $V_{db}$ of the rectifier 20 is approximated by a cosine wave that is twice the product of the number P of phases of the alternating-current power supply 10 and an angular frequency ω of the alternating-current power supply 10, the output voltage $V_{db}$ is expressed by formula (1).

Formula 1:

$$V_{db} = \frac{V_{max} - V_{min}}{2}\cos\{(2P)\omega t\} + \frac{V_{max} + V_{min}}{2} \tag{1}$$

In formula (1), $V_{max}$ denotes the maximum value of the output voltage of the rectifier 20, and $V_{min}$ denotes the minimum value of the output voltage of the rectifier 20. Note that the angular frequency ω of the alternating-current power supply 10 is expressed by ω=2πf, where f is the power-supply frequency of the alternating-current power supply 10. In addition, in the power converting apparatus 100 illustrated in FIG. 1, circuit equations are expressed by formulas (2) to (4) below. Note that in a case where the alternating-current power supply 10 is a three-phase power supply, $V_{max}$ may be defined as the maximum value of line voltage of the power supply voltage, and $V_{max} \times \cos 30°$ may be substituted for $V_{min}$. In addition, in a case where the alternating-current power supply 10 is a single-phase power supply, $V_{max}$ may be defined as the maximum value of the power supply voltage, and $V_{min}$ may be set such that $V_{min}=0$.

Formula 2:

$$V_{db} - V_{dc} = RI_{dc} + L\frac{dI_{dc}}{dt} \tag{2}$$

Formula 3:

$$I_z = \frac{P_{out}}{V_{dc}} \tag{3}$$

Formula 4:

$$C\frac{dV_{dc}}{dT} = I_{dc} - I_z \tag{4}$$

In formulas (2) to (4), $V_{dc}$ denotes the voltage across the capacitor 33, R denotes the resistance component 32 of the reactor 30, that is, a resistance value, $I_{dc}$ denotes a current flowing through the reactor 30, L denotes the inductance component 31 of the reactor 30, that is, an inductance value, $I_z$ denotes the current flowing through the load 40, $P_{out}$ denotes output power of the load 40, and C denotes the electrostatic capacitance of the capacitor 33. Note that formula (4) represents the current $I_c$ flowing through the capacitor 33. Here, when it is assumed that there is no charging or discharging of the capacitor 33 and the capacitor 33 operates with the voltage $V_{dc}$ across the capacitor 33 kept at a constant level at the center of the amplitude of the output voltage $V_{db}$ of the rectifier 20, formulas (5) and (6) are established. Formulas (5) and (6) represent a state in which the output voltage $V_{db}$ of the rectifier 20 is directly supplied to the load 40 without being stored in the capacitor 33.

Formula 5:

-continued $$I_z = I_{dc} \tag{5}$$

Formula 6:

$$V_{dc} = \frac{V_{max} + V_{min}}{2} \tag{6}$$

Formula (7) is obtained by transformation of formula (1)

Formula 7:

$$I_{dc} = \frac{1}{L} \int (V_{db} - V_{dc} - RI_{dc}) dt \tag{7}$$

Here, assuming that $V_{db}-V_{dc} \gg RI_{dc}$, formulas (1) and (6) are substituted into formula (7). Then, formula (8) is obtained. In formula (8), Const is an integration constant.

Formula 8:

$$I_{dc} = \frac{1}{L} \int (V_{db} - V_{dc}) dt = \frac{V_{max} - V_{min}}{2L} \left( \frac{\sin\{(2P)\omega t\}}{(2P)\omega} + Const \right) \tag{8}$$

Based on formulas (3), (5), and (8), the output power $P_{out}$ of the load 40 for reducing the charging and discharging current of the capacitor 33 is obtained as expressed by formula (9). Here, a first term on the right side of formula (9) is an alternating-current component that changes, and a second term on the right side is a direct-current component. Therefore, if the output power $P_{out}$ of the load 40 is changed by means of a pulsation command of $2P\omega t$, the current $I_c$ flowing through the capacitor 33 can be reduced. Note that the first term on the right side of formula (9) applies to a case where the charging and discharging current of the capacitor 33 is controlled and kept at substantially zero, and in a case where the charging and discharging current is not controlled and kept at substantially zero, the alternating-current component may be set to an amplitude equal to or less than the value obtained in the first term on the right side of formula (9).

Formula 9:

$$P_{out} = V_{dc} I_{dc} = \frac{V_{max}^2 - V_{min}^2}{4L} \left( \frac{\sin\{(2P)\omega t\}}{(2P)\omega} + Const \right) \tag{9}$$

Figure 3:
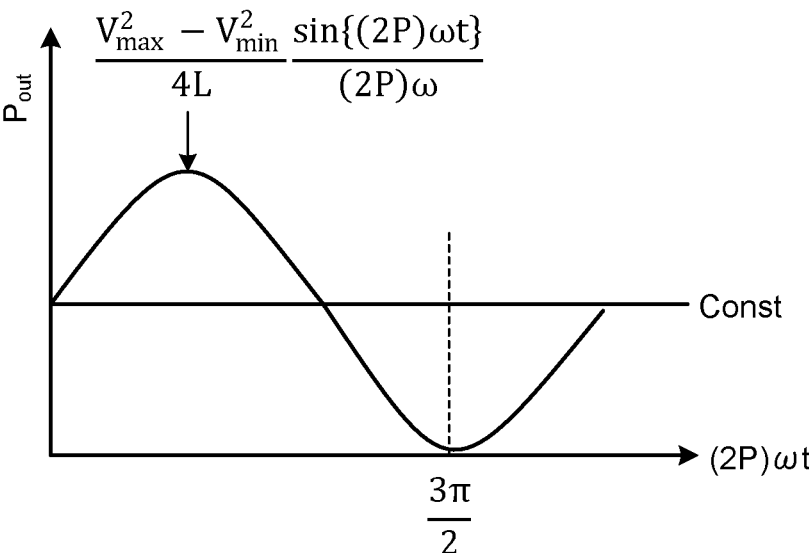
FIG. 3 is a diagram showing an example of output power of a load of the power converting apparatus according to the first embodiment.

FIG. 3 is a diagram showing an example of the output power $P_{out}$ of the load 40 of the power converting apparatus 100 according to the first embodiment. In FIG. 3, the horizontal axis represents time, and the vertical axis represents voltage. An alternating-current component $P_{out\_ac}$ of the output power $P_{out}$ of the load 40 is expressed by formula (10). The alternating-current component $P_{out\_ac}$ of the output power $P_{out}$ of the load 40 is power pulsation caused in power to be consumed by the load 40.

Formula 10:

$$P_{out\_ac} = \frac{V_{max}^2 - V_{min}^2}{4L} \frac{\sin\{(2P)\omega t\}}{(2P)\omega} \tag{10}$$

As illustrated in FIG. 3, an amplitude corresponding to a direct-current component of zero is a limit value of the alternating-current component $P_{out\_ac}$ of the output power $P_{out}$ of the load 40. That is, formula (11) represents the integration constant Const that causes the output power $P_{out}$ of the load 40 to become zero ($P_{out}$=0) when $\sin\{(2P)\omega t\}$=−1.

Formula 11:

$$Const = \frac{1}{(2P)\omega} \tag{11}$$

A direct-current component $P_{out\_dc}$ of the output power $P_{out}$ of the load 40 is expressed by formula (12) based on formulas (9) and (11).

Formula 12:

$$P_{out\_dc} = \frac{V_{max}^2 - V_{min}^2}{4L} \frac{1}{(2P)\omega} \tag{12}$$

Therefore, it is possible to reduce the charging and discharging current of the capacitor 33 by ensuring the inductance value L of the reactor 30 equal to or greater than a value shown in formula (13) in the direct-current component $P_{out\_dc}$ of the output power $P_{out}$ of the load 40, which is the average power of the output power $P_{out}$ of the load 40.

Formula 13:

$$L = \frac{V_{max}^2 - V_{min}^2}{4P_{out\_dc}} \frac{1}{(2P)\omega} \tag{13}$$

Here, in a case where the integration constant Const is obtained which causes the output power $P_{out}$ of the load 40 to become zero ($P_{out}$=0) when $\sin\{(2P)\omega t\}$=−1, the output power $P_{out}$ of the load 40 changes in a range shown in formula (14), based on formulas (9) and (11). Therefore, when the load 40 is a motor or the like, rotation speed or the like may greatly fluctuate to adversely affect the operation of the power converting apparatus 100.

Formula 14:

$$P_{out} = V_{dc} I_{dc} = \frac{V_{max}^2 - V_{min}^2}{4L} \left( \frac{\sin\{(2P)\omega t\}}{(2P)\omega} + \frac{1}{(2P)\omega} \right) \tag{14}$$

Thus, there is a case where it is desired to set the alternating-current component to, for example, $1/\alpha$ of rated power in the power converting apparatus 100. However, when controlling and keeping the charging and discharging current of the capacitor 33 at substantially zero, the power converting apparatus 100 needs to ensure an alternating-current component based on formula (14), that is, a first term on the right side. Therefore, assuming that the output power $P_{out}$ of the load 40 is 1−(1/$\alpha$) when $\sin\{(2P)\omega t\}$=−1 in a case where the amplitude of the alternating-current component is 1/a of the direct-current component, the integration constant Const is expressed by formula (15).

Formula 15:

-continued $$\left(1 - \frac{1}{\alpha}\right) \frac{V_{max}^2 - V_{min}^2}{4L} Const = \frac{V_{max}^2 - V_{min}^2}{4L} \left(\frac{\sin\{(2P)\omega t\}}{(2P)\omega} + Const\right) \quad (15)$$

$$Const = \frac{\alpha}{(2P)\omega}$$

Thus, the direct-current component $P_{out\_dc}$ of the output power $P_{out}$ of the load 40 is expressed by formula (16) based on formula (15). Accordingly, the output power $P_{out}$ of the load 40 is expressed by formula (17).

Formula 16:

$$P_{out\_dc} = \frac{V_{max}^2 - V_{min}^2}{4L} \frac{\alpha}{(2P)\omega} \quad (16)$$

Formula 17:

$$P_{out} = \frac{V_{max}^2 - V_{min}^2}{4L} \left(\frac{\sin\{(2P)\omega t\}}{(2P)\omega} + \frac{\alpha}{(2P)\omega}\right) \quad (17)$$
$$= \frac{V_{max}^2 - V_{min}^2}{4(L/\alpha)} \left(\frac{1}{\alpha} \frac{\sin\{(2P)\omega t\}}{(2P)\omega} + \frac{1}{(2P)\omega}\right)$$

Here, in order to reduce the charging and discharging current of the capacitor 33, it is important to cause the output power $P_{out}$ of the load 40 to pulsate with the alternating-current component of a first term on the right side of formula (17). In addition, it can be seen that a necessary pulsating quantity is determined by the maximum value $V_{max}$ of the output voltage of the rectifier 20, the minimum value $V_{min}$ of the output voltage of the rectifier 20, the inductance value L of the reactor 30, the number P of phases of the alternating-current power supply 10, and the angular frequency ω of the alternating-current power supply 10 in the first term on the right side. The above-described elements are determined by specifications of the alternating-current power supply 10, except for the inductance value L of the reactor 30. Therefore, it can be seen that the setting of the inductance value L of the reactor 30 is important.

Assume that $P_{out}(\alpha=1)$ denotes the output power $P_{out}$ of the load 40 to be obtained when α=1, and $P_{out}(\alpha=10)$ denotes the output power $P_{out}$ of the load 40 to be obtained when α=10. Since the first term on the right side of formula (17) is an alternating-current component, an average value thereof is treated as 0. Then, in order to cause the alternating-current component in the first term on the right side to match the direct-current component in the second term on the right side, the inductance value L of the reactor 30 to be obtained when α=10 just needs to be set to a value that is 10 times the inductance value L of the reactor 30 to be obtained when α=1. With this setting, the output power $P_{out}(\alpha=1)$ of the load 40 and the output power $P_{out}(\alpha=10)$ of the load 40 have equal average values, and have a relationship of 10:1 in terms of the amplitude of the alternating-current component in the first term on the right side. As a result, the pulsating quantity of the output power $P_{out}$ of the load 40 can be reduced. That is, as a result of setting the inductance value L of the reactor 30 as shown in formula (18), it is possible to reduce the amplitude of the alternating-current component in the first term on the right side of formula (17) without changing the direct-current component in the second term on the right side of formula (17).

Formula 18:

-continued $$L = \frac{V_{max}^2 - V_{min}^2}{4P_{out\_dc}} \frac{\alpha}{(2P)\omega} \quad (18)$$

When the coefficient α is less than 1, the amplitude of the alternating-current component of the output power $P_{out}$ of the load 40 becomes larger than the direct-current component of the output power $P_{out}$ of the load 40, so that power becomes negative. Therefore, the coefficient α is desirably equal to or greater than 1. Furthermore, there are no particular restrictions on the upper limit of the coefficient α. Meanwhile, since an increase in the coefficient α will reduce the ratio of the pulsation amplitude of the alternating-current component of the output power $P_{out}$ of the load 40 to the direct-current component thereof, so that the amount of change in the output power $P_{out}$ of the load 40 can be reduced. However, since an increase in the inductance value L of the reactor 30 causes an increase in size, the coefficient α is desirably equal to or less than about 10. That is, the power converting apparatus 100 can reduce the charging and discharging current of the capacitor 33 without increasing the size of the reactor 30, by setting the coefficient α in this way. In addition, the required number of the capacitors 33 is also reduced due to a reduction in electrostatic capacitance. As a result, the area of a portion where a substrate is mounted is reduced, so that miniaturization and weight reduction can be achieved.

The method for controlling the output power $P_{out}$ of the load 40 and the method for setting the inductance value L of the reactor 30, so as to control and keep the charging and discharging current of the capacitor 33 at substantially zero, have been described thus far. However, there is a tolerance for a prescribed charging and discharging current, that is, a ripple tolerance, in the capacitor 33. In the power converting apparatus 100, when the ratio of an alternating-current pulsation amplitude to the direct-current component is reduced or the inductance value L of the reactor 30 is reduced regardless of, for example, formulas (17) and (18), the charging and discharging current increases proportionally. However, it is possible to reduce the inductance value L of the reactor 30 and the ratio of the alternating-current pulsation amplitude to the direct-current component of the output power $P_{out}$ of the load 40 without affecting the ripple tolerance of the capacitor 33, the life of the capacitor 33 due to a temperature rise, and the like.

Here, a ripple current $I_r$ of the capacitor 33 with respect to the alternating-current component $P_{out\_ac}$ of the output power $P_{out}$ of the load 40 is expressed by formula (19). Note that when $I_{r0}$ denotes a ripple current value to be obtained in a case where the output power $P_{out}$ of the load 40 is not pulsated, and $P_{out\_ac0}$ denotes an alternating-current component of the output power $P_{out}$ of the load 40 that allows the ripple current $I_r$ to be controlled and kept at substantially zero, characteristics are obtained as illustrated in FIG. 4.

Formula 19:

$$I_r = \frac{-I_{r0}}{P_{out\_ac0}} P_{out\_ac} + I_{r0} \quad (19)$$

Figure 4:
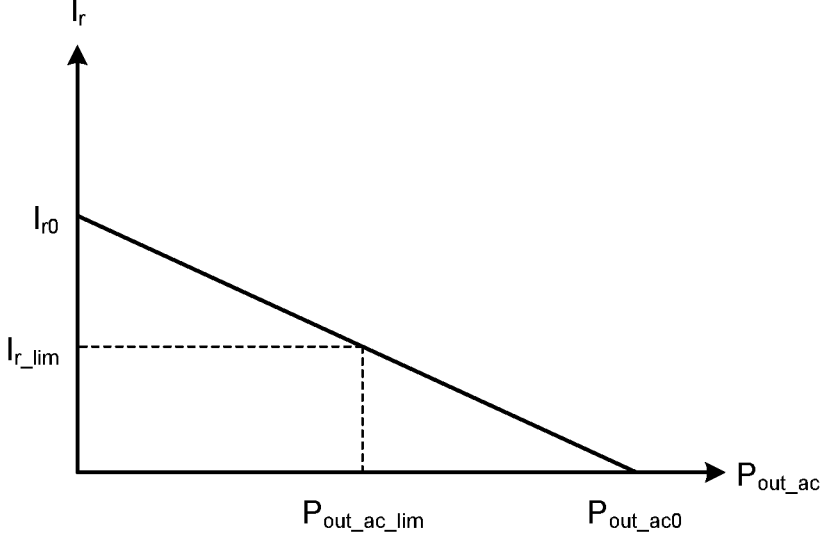
FIG. 4 is a diagram illustrating a relationship between an alternating-current component of the output power of the load and ripple current of a capacitor in the power converting apparatus according to the first embodiment.

FIG. 4 is a diagram illustrating a relationship between the alternating-current component $P_{out\_ac}$ of the output power $P_{out}$ of the load 40 and the ripple current $I_r$ of the capacitor 33 in the power converting apparatus 100 according to the first embodiment. In FIG. 4, the horizontal axis represents power, and the vertical axis represents current. As illustrated in FIG. 4, $I_{r\_lim}$ is defined as a current value of the ripple tolerance of the capacitor 33, and $P_{out\_ac\_lim}$ is defined as the alternating-current component $P_{out\_ac}$ of the output power $P_{out}$ of the load 40 to be obtained when the ripple current $I_r$ of the capacitor 33 is equal to the ripple tolerance $I_{r\_lim}$ of the capacitor 33. It is possible to cause the power converting apparatus 100 to operate at a current value equal to or less than the ripple tolerance $I_{r\_lim}$ of the capacitor 33 by setting the alternating-current component $P_{out\_ac}$ of the output power $P_{out}$ of the load 40 within a range from $P_{out\_ac\_lim}$ to $P_{out\_ac0}$. For example, when the ripple current value $I_{r0}$ to be obtained in a case where the output power $P_{out}$ is not pulsated is a value twice as large as the ripple tolerance $I_{r\_lim}$, the power converting apparatus 100 controls the alternating-current component $P_{out\_ac}$ of the output power $P_{out}$ of the load 40 such that the alternating-current component $P_{out\_ac}$ is ½ of the alternating-current component $P_{out\_ac0}$ of the output power $P_{out}$ of the load 40 that allows the ripple current $I_r$ to be controlled and kept at substantially zero. As a result, the power converting apparatus 100 can control the ripple current $I_r$ of the capacitor 33 such that the ripple current $I_r$ falls within an allowable range, and can be operated while minimizing the effect on the load 40 due to a change in the output power $P_{out}$ of the load 40.

Figure 5:
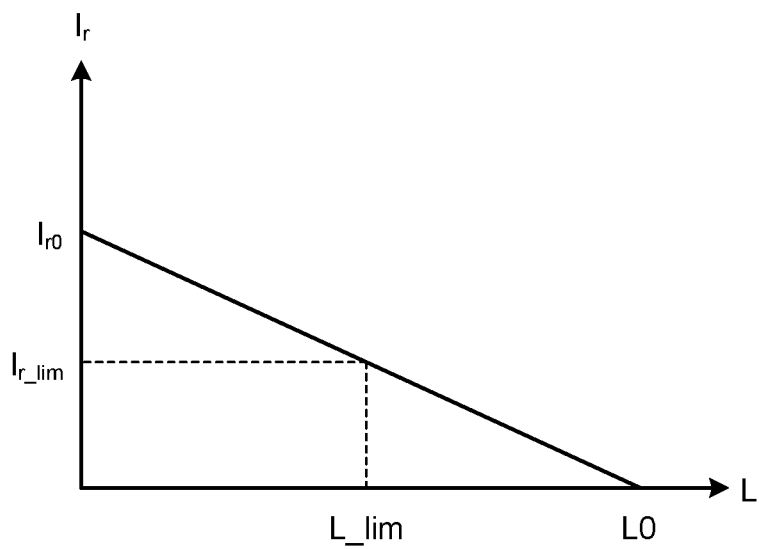
FIG. 5 is a diagram illustrating a relationship between an inductance value of a reactor and the ripple current of the capacitor in the power converting apparatus according to the first embodiment.

In addition, as illustrated in FIG. 5, when L0 denotes the inductance value L of the reactor 30, shown in formula (18), for making the charging and discharging current of the capacitor 33 substantially zero, and $I_{r\_lim}$ is defined as a current value of the ripple tolerance of the capacitor 33, the power converting apparatus 100 can be operated at the current value equal to or less than the ripple tolerance $I_{r\_lim}$ of the capacitor 33 by setting the inductance value L of the reactor 30 within a range from L_lim to L0. FIG. 5 is a diagram illustrating a relationship between the inductance value L of the reactor 30 and the ripple current $I_r$ of the capacitor 33 in the power converting apparatus 100 according to the first embodiment. In FIG. 5, the horizontal axis represents the inductance value L of the reactor 30, and the vertical axis represents the ripple current $I_r$ of the capacitor 33. That is, as shown in formula (20), the inductance value L of the reactor 30 is set to a value obtained by multiplication of formula (18) by a coefficient β that takes into consideration a tolerance $(I_{r0}–I_{r\_lim})/I_{r0}$ with respect to the ripple tolerance $I_{r\_lim}$ of the capacitor 33. Note that the range of the coefficient β is shown in formula (21). As a result, the power converting apparatus 100 can achieve both of reduction in the size and weight of the reactor 30 and prolongation of the life of the capacitor 33. Note that the coefficients α and β do not need to be set separately, and may be set in a range shown in formula (22) in consideration of the coefficients α and β. A coefficient αβ is a coefficient based on a load pulsation allowable value and the ripple tolerance $I_{r\_lim}$ of the capacitor 33.

Formula 20:

$$L = \frac{V_{max}^2 - V_{min}^2}{4P_{out\_dc}} \frac{\alpha\beta}{(2P)\omega} \tag{20}$$

Formula 21:

$$\frac{I_{r0} - I_{r\_lim}}{I_{r0}} \leq \beta \leq 1 \tag{21}$$

Formula 22:

-continued $$\frac{I_{r0} - I_{r\_lim}}{I_{r0}} \leq \alpha\beta \leq 10 \tag{22}$$

As described above, in the power converting apparatus 100, the range of the inductance value L of the reactor 30 is defined by use of the maximum value $V_{max}$ of the output voltage of the rectifier 20, the minimum value $V_{min}$ of the output voltage of the rectifier 20, the direct-current component $P_{out\_dc}$ of the output power $P_{out}$ of the load 40, the number P of phases of the alternating-current power supply 10, the angular frequency ω of the alternating-current power supply 10, the ripple current value $I_{r0}$ of the capacitor 33, which is a pulsating quantity to be obtained when the output power $P_{out}$ of the load 40 is not pulsated, and the ripple tolerance $I_{r\_lim}$ of the capacitor 33. As described above, the power converting apparatus 100 can achieve both reduction of the fluctuation of the load 40 and reduction of the size and weight of the reactor 30 by considering the amount of change in the alternating-current component $P_{out\_ac}$ of the output power $P_{out}$ of the load 40, the inductance value L of the reactor 30, and the like while considering the ripple tolerance $I_{r\_lim}$ of the capacitor 33. Note that the range of the inductance value L of the reactor 30 may be defined by use of the maximum value $V_{max}$ of the output voltage of the rectifier 20, the minimum value $V_{min}$ of the output voltage of the rectifier 20, the direct-current component $P_{out\_dc}$ of the output power $P_{out}$ of the load 40, the number P of phases of the alternating-current power supply 10, and the angular frequency ω of the alternating-current power supply 10.

Figure 6:
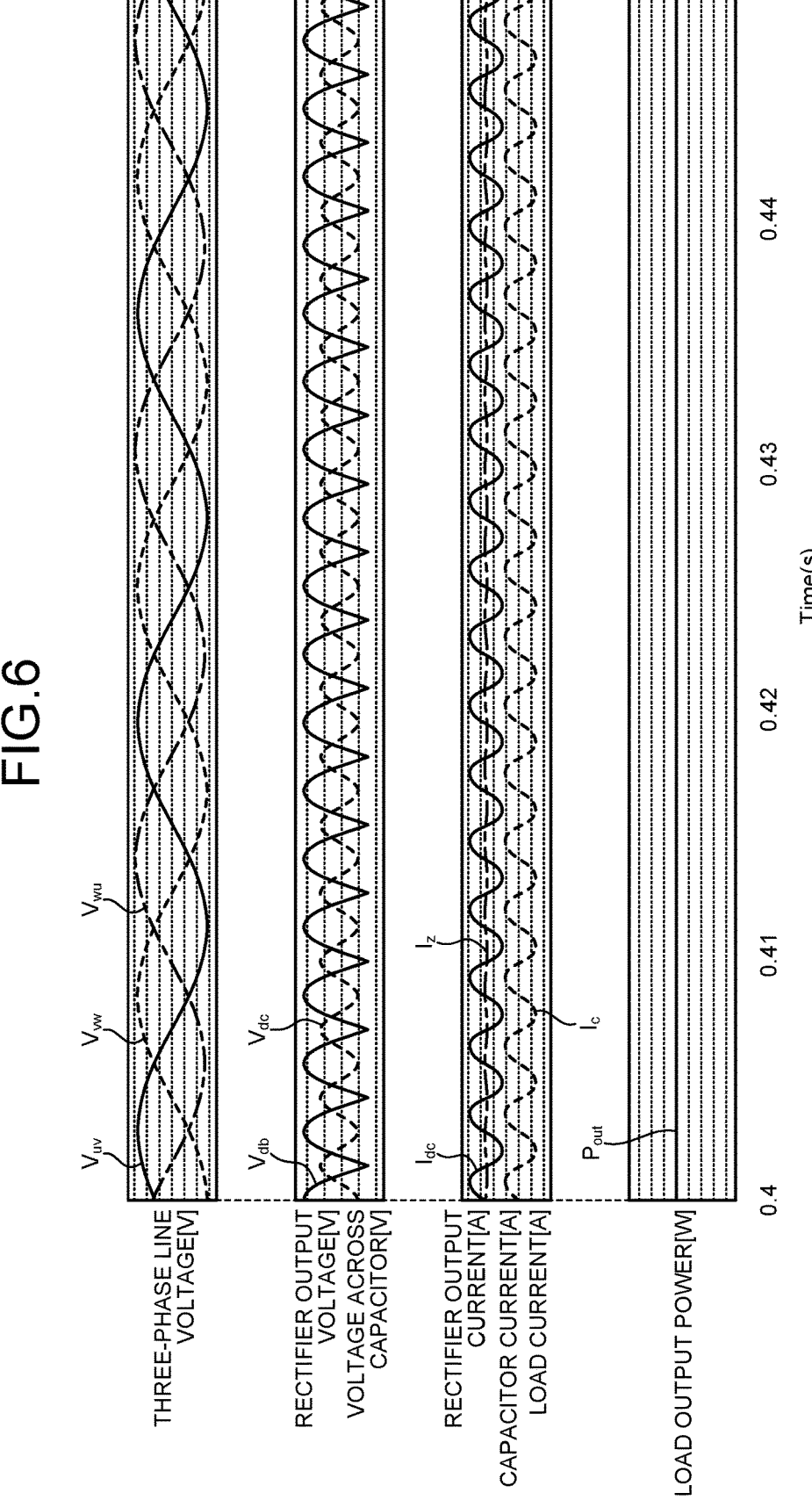
FIG. 6 is a diagram showing, as a comparative example, an example of results of analysis performed when the power converting apparatus does not change the output power of the load.

Actual operation will be described. FIG. 6 is a diagram showing, as a comparative example, an example of results of analysis performed when the power converting apparatus 100 does not change the output power $P_{out}$ of the load 40. In FIG. 6, an analysis result in a first row shows voltages output from the alternating-current power supply 10 to the rectifier 20, that is, three-phase line voltages $V_{uv}$, $V_{vw}$, and $V_{wu}$. Note that the three phases are represented as a U phase, a V phase, and a W phase. An analysis result in a second row shows the output voltage $V_{db}$ of the rectifier 20 and the voltage $V_{dc}$ across the capacitor 33. An analysis result in a third row shows output current of the rectifier 20, that is, the current $I_{dc}$ flowing through the reactor 30, the current $I_c$ flowing through the capacitor 33, and the current $I_z$ flowing through the load 40. An analysis result in a fourth row shows the output power $P_{out}$ of the load 40. Note that the horizontal axis represents time in the analysis results of the first to fourth rows. When the output power $P_{out}$ of the load 40 is kept constant in the power converting apparatus 100, the current $I_c$ of the capacitor 33 greatly pulsates and charging and discharging are repeated, so that the charging and discharging current of the capacitor 33, that is, the ripple current $I_r$ increases. Therefore, it is not possible to achieve miniaturization and weight reduction of the capacitor 33 by reducing the electrostatic capacitance of the capacitor 33.

Figure 7:
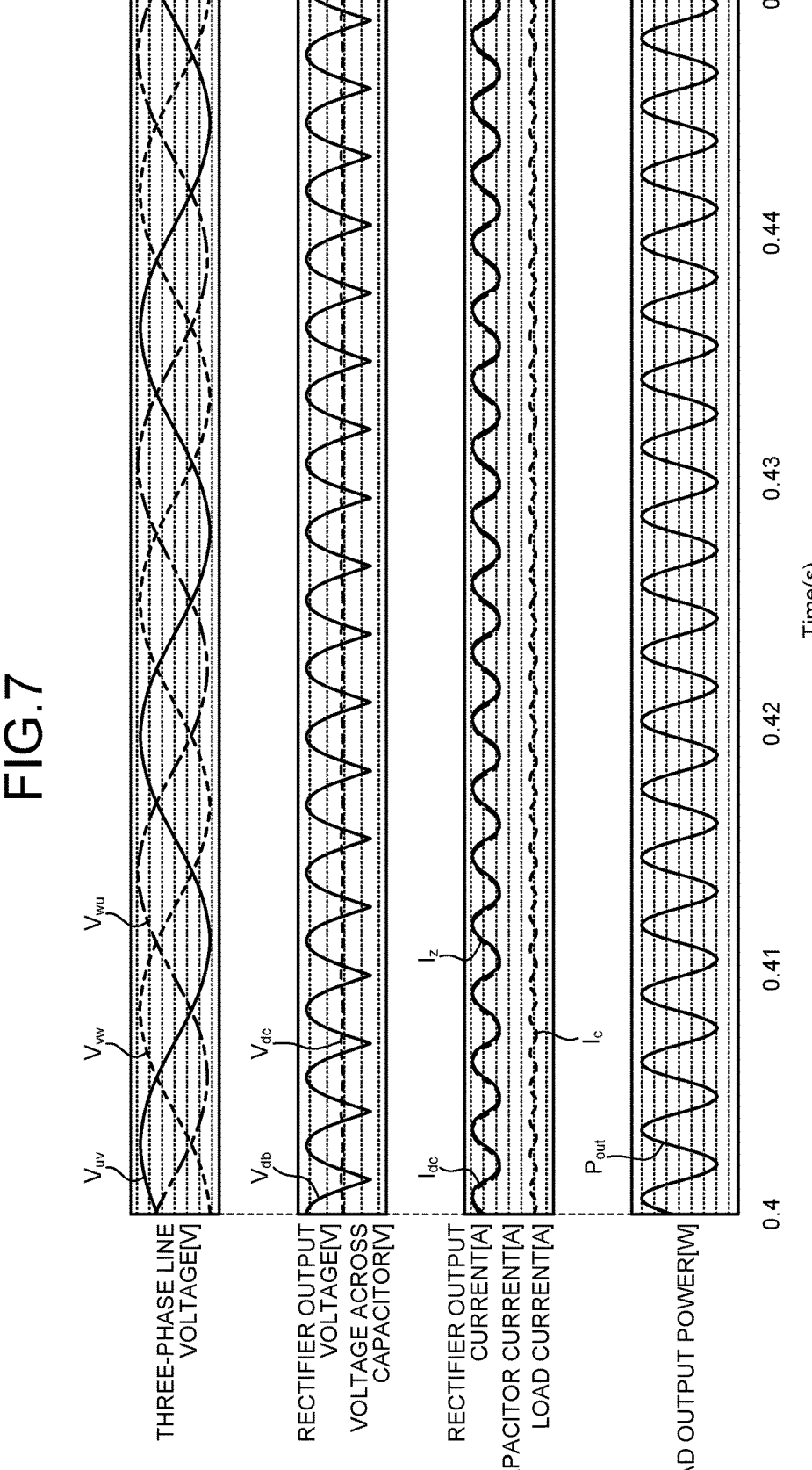
FIG. 7 is a diagram showing an example of results of analysis performed when the power converting apparatus according to the first embodiment changes the output power of the load to reduce a charging and discharging current of the capacitor.

FIG. 7 is a diagram showing an example of results of analysis performed when the power converting apparatus 100 according to the first embodiment changes the output power $P_{out}$ of the load 40 to reduce the charging and discharging current of the capacitor 33. In FIG. 7, respective items of analysis results shown in first to fourth rows are the same as those in FIG. 6. FIG. 7 illustrates analysis results to be obtained in a case where the inductance value L of the reactor 30 is set with the coefficients α and β that have been set such that α=3 and β=1, and the output power $P_{out}$ of the load 40 is changed to reduce the charging and discharging current of the capacitor 33 in the power converting apparatus 100. Looking at current waveforms as the analysis result in the third row, it can be seen that the output current of the rectifier 20, that is, the current $I_{dc}$ flowing through the reactor 30, coincides with the current $I_z$ flowing through the load 40, and as a result, the current $I_c$ of the capacitor 33 becomes substantially zero. In the example of FIG. 7, the coefficient α is adjusted such that the alternating-current component, which is the pulsating quantity of the load 40, is ⅓ of the direct-current component. If it is desired to obtain the alternating-current component that is ¹⁄₁₀ of the direct-current component, the coefficient α just needs to be set such that α=10.

Figure 8:
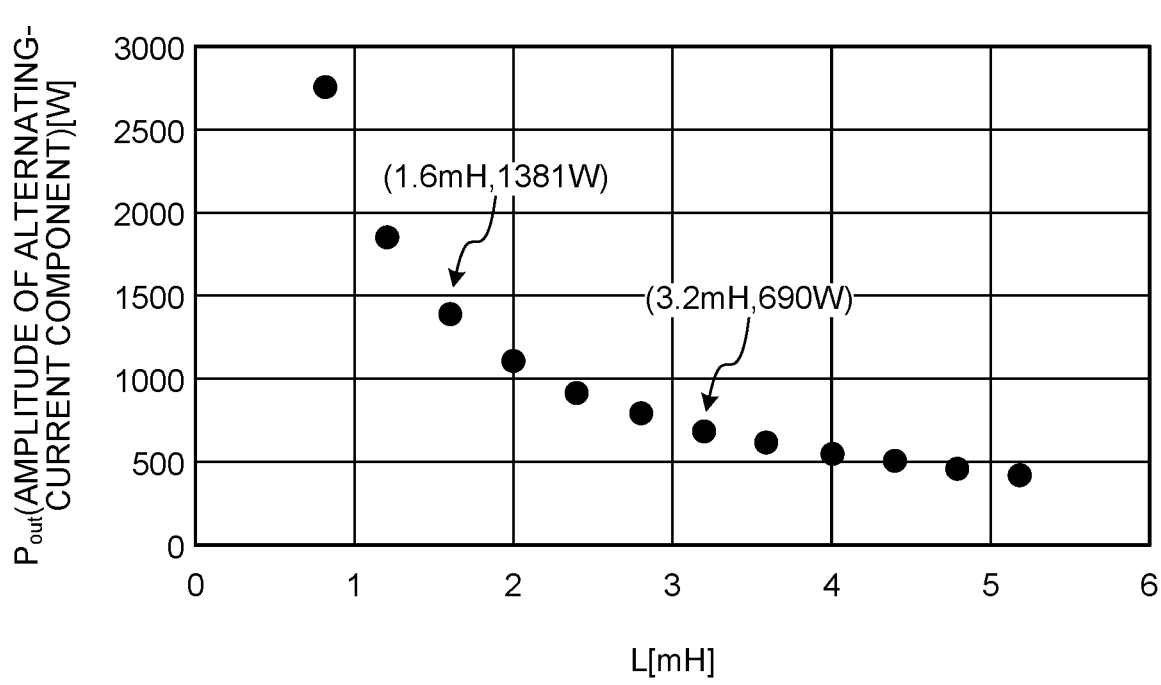
FIG. 8 is a diagram illustrating a relationship between the inductance value of the reactor and the alternating-current component of the output power of the load in the power converting apparatus according to the first embodiment.

FIG. 8 is a diagram illustrating a relationship between the inductance value L of the reactor 30 and the alternating-current component of the output power $P_{out}$ of the load 40 in the power converting apparatus 100 according to the first embodiment. In FIG. 8, the horizontal axis represents the inductance value L of the reactor 30, and the vertical axis represents the alternating-current component of the output power $P_{out}$ of the load 40. As can be seen from FIG. 8, the alternating-current component of the output power $P_{out}$ of the load 40 decreases as the inductance value L of the reactor 30 increases in the power converting apparatus 100. Note that since the inductance value L of the reactor 30 increases, the charging and discharging current of the capacitor 33 increases as a result of selecting the coefficient β that falls within the range shown in formula (21). However, it is possible to achieve both miniaturization and weight reduction of the reactor 30 and the capacitor 33 by adjusting the coefficient β within a range of the ripple tolerance $I_{r\_lim}$ of the capacitor 33.

In the power converting apparatus 100, current flows directly from the alternating-current power supply 10 to the load 40, and charging of the capacitor 33 is avoided, so that it is also possible to reduce current distortion due to the conventional charging of the capacitor 33. As a result, the power converting apparatus 100 can, for example, ensure tolerance for a limit value of power line harmonics defined by Japanese Industrial Standards (JIS), International Electrotechnical Commission (IEC), or the like, and improve a power factor.

Note that when the alternating-current power supply 10 is a single-phase power supply, the conduction state of the rectifier 20 changes according to the polarity of the power supply voltage, but when the capacitor 33 is not charged, the power converting apparatus 100 can be approximated by an RL circuit, and power supply current has retardation in phase with respect to the power supply voltage. Here, in the power converting apparatus 100, when the reactor 30 is disposed at a subsequent stage of the rectifier 20, current cannot continuously flow depending on the conduction state of the rectifier 20. Therefore, when the alternating-current power supply 10 is a single-phase power supply, the power converting apparatus 100 is configured such that the reactor 30 is disposed between the alternating-current power supply 10 and the rectifier 20. As a result, current can continuously flow without being affected by the rectifier 20, and harmonic components of the current can be reduced.

In the power converting apparatus 100, the load 40 can be applied to any of a resistance load, a constant current load, and a constant power load as long as power to be consumed is variable. Examples of the constant power load include an inverter that drives an inductive load. In particular, when the inductive load is a motor, the work of the motor is represented by the product of torque and angular frequency. That is, the power converting apparatus 100 can control power based on formula (18) by making the torque or the angular frequency variable.

Figure 9:
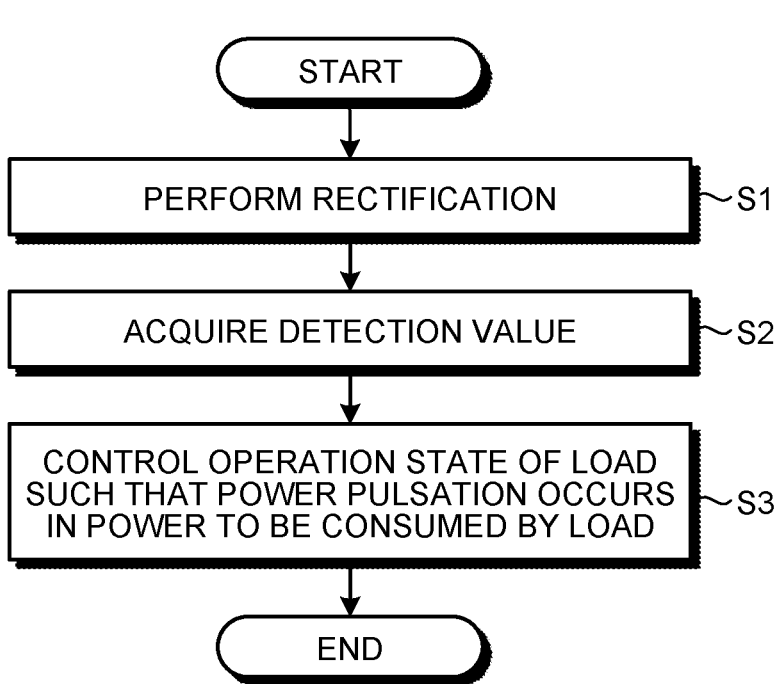
FIG. 9 is a flowchart illustrating operation of the power converting apparatus according to the first embodiment.

FIG. 9 is a flowchart illustrating operation of the power converting apparatus 100 according to the first embodiment. In the power converting apparatus 100, the rectifier 20 rectifies alternating-current power output from the alternating-current power supply 10 (step S1). The control unit 45 acquires a detection value indicating an operation state of the power converting apparatus 100 from a detection unit (not illustrated) (step S2). In order to reduce the charging and discharging current of the capacitor 33, the control unit 45 controls the operation state of the load 40 such that power pulsation occurs in power to be consumed by the load 40 (step S3).

Figure 10:
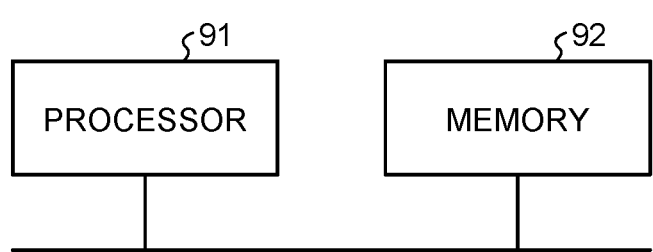
FIG. 10 is a diagram showing an example of a hardware configuration for implementing a control unit included in the power converting apparatus according to the first embodiment.

Next, a hardware configuration of the control unit 45 included in the power converting apparatus 100 will be described. FIG. 10 is a diagram showing an example of a hardware configuration for implementing the control unit 45 included in the power converting apparatus 100 according to the first embodiment. The control unit 45 is implemented by a processor 91 and a memory 92.

The processor 91 is a central processing unit (CPU, also referred to as a processing unit, an arithmetic device, a microprocessor, a microcomputer, a processor, or a digital signal processor (DSP)) or a system large-scale integration (LSI). Examples of the memory 92 include nonvolatile or volatile semiconductor memories such as a random access memory (RAN), a read only memory (ROM), a flash memory, an erasable programmable read only memory (EPROM), and an electrically erasable programmable read only memory (EEPROM (registered trademark)). Furthermore, the memory 92 is not limited thereto, and may be a magnetic disk, an optical disk, a compact disk, a mini disk, or a digital versatile disc (DVD).

As described above, according to the present embodiment, the power converting apparatus 100 reduces the charging and discharging current of the capacitor 33 by causing power pulsation in power to be consumed by the load 40, and uses the reactor 30 having an inductance value in a prescribed range. As a result, the power converting apparatus 100 can reduce the charging and discharging current of the capacitor 33, and can prolong the life of the capacitor 33 by reducing ripple current even when a low-cost capacitor is used as the capacitor 33.

Second Embodiment

In a second embodiment, a heat pump apparatus including the power converting apparatus 100 and an air conditioner including the heat pump apparatus will be described.

Figure 11:
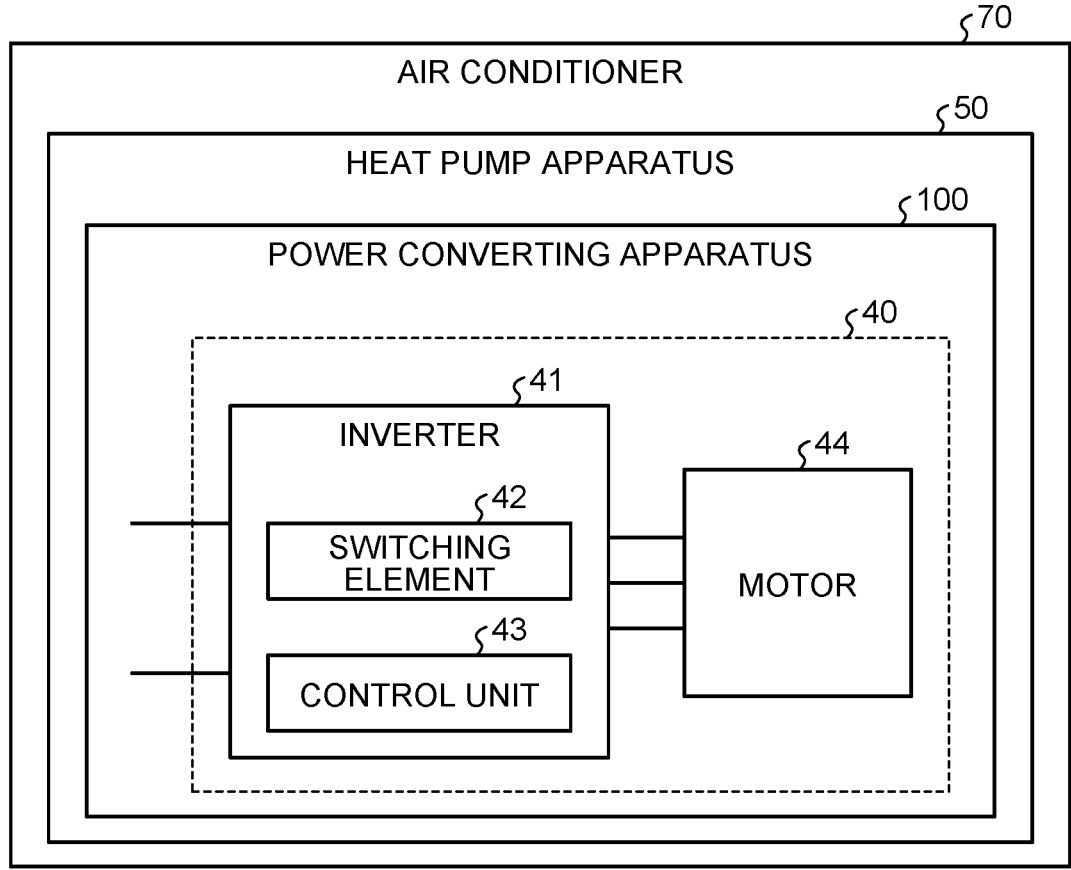
FIG. 11 is a diagram showing a configuration example of an air conditioner according to a second embodiment.

FIG. 11 is a diagram showing a configuration example of an air conditioner 70 according to the second embodiment. The air conditioner 70 includes a heat pump apparatus 50. The heat pump apparatus 50 includes the power converting apparatus 100. Note that although only the load 40 of the power converting apparatus 100 is illustrated in FIG. 11 for the sake of simplicity, the power converting apparatus 100 includes the rectifier 20 and the like as in FIG. 1. In the second embodiment, the load 40 of the power converting apparatus 100 to be installed in the heat pump apparatus 50 includes an inverter 41 and a motor 44. The inverter 41 converts direct-current power into alternating-current power. The motor 44 is driven by alternating-current power output from the inverter 41. The inverter 41 includes a switching element 42 and a control unit 43. The switching element 42 converts direct-current power into alternating-current power. The control unit 43 controls operation of the switching element 42

Figure 12:
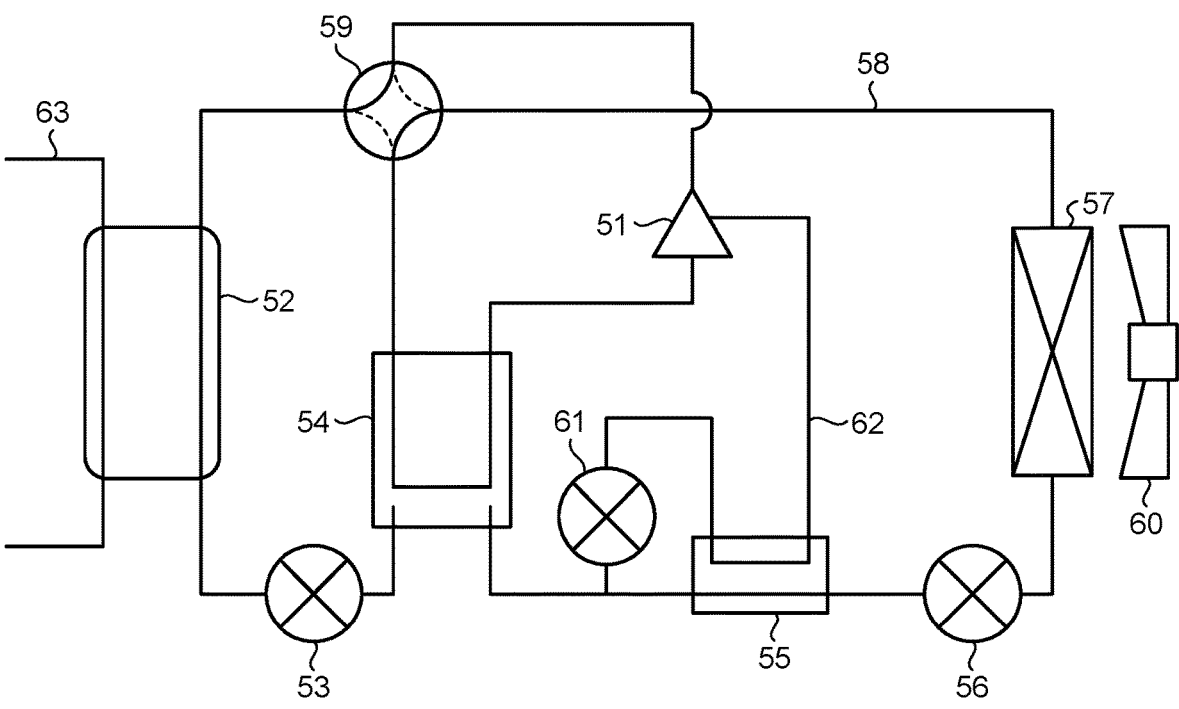
FIG. 12 is a diagram illustrating a circuit configuration of a heat pump apparatus according to the second embodiment.

FIG. 12 is a diagram illustrating a circuit configuration of the heat pump apparatus 50 according to the second embodiment. The heat pump apparatus 50 includes a main refrigerant circuit 58 in which a compressor 51, a heat exchanger 52, an expansion mechanism 53, a receiver 54, an internal heat exchanger 55, an expansion mechanism 56, and a heat exchanger 57 are sequentially connected by pipes to circulate a refrigerant. In the main refrigerant circuit 58, a four-way valve 59 is provided on a discharge side of the compressor 51 so as to allow a direction of circulation of the refrigerant to be switched. Furthermore, a fan 60 that is a cooling fan is provided near the heat exchanger 57. Although not illustrated in FIG. 12, the compressor 51 includes the motor 44, which is driven by the inverter 41, and a compression mechanism. The heat pump apparatus 50 further includes an injection circuit 62 that connects a point between the receiver 54 and the internal heat exchanger 55 to an injection pipe of the compressor 51 by means of a pipe. An expansion mechanism 61 and the internal heat exchanger 55 are sequentially connected to the injection circuit 62. The heat exchanger 52 is connected to a water circuit 63 through which water circulates. Note that although not illustrated, the water circuit 63 is connected to a device using water of a radiator and the like of the heat exchanger 52, such as a water heater, a radiator, or a floor heating device.

Figure 13:
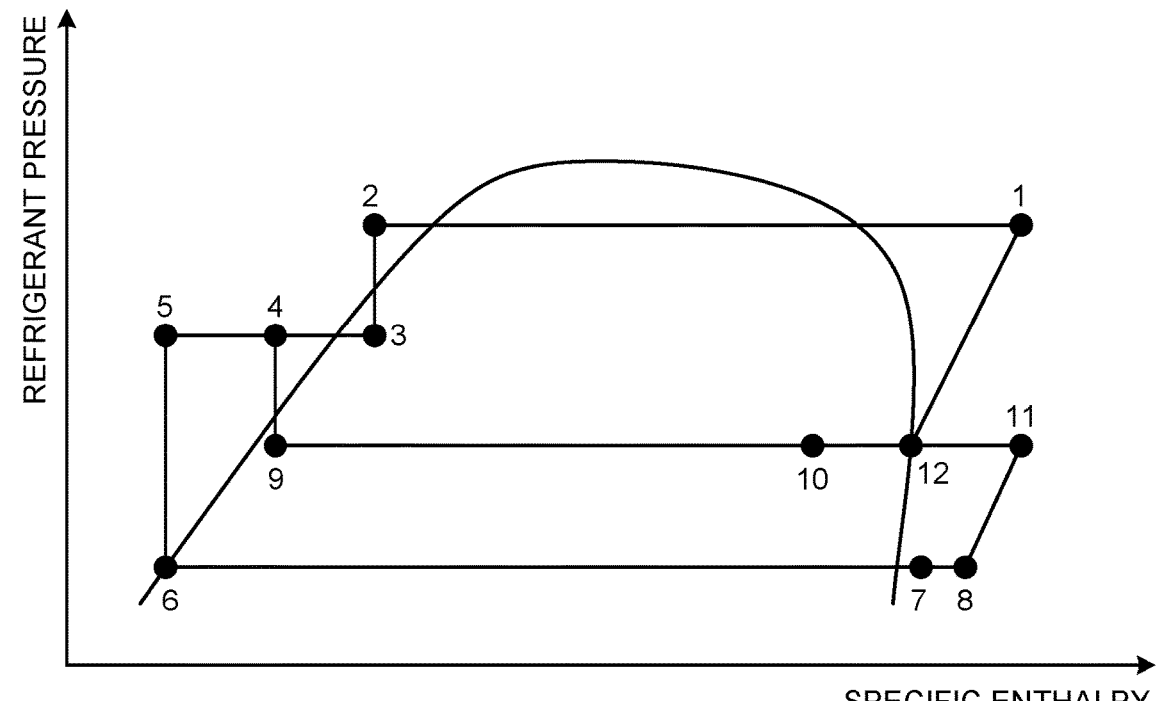
FIG. 13 is a Mollier chart illustrating the state of a refrigerant in the heat pump apparatus according to the second embodiment.

First, how the heat pump apparatus 50 works during heating operation will be described. During the heating operation, the four-way valve 59 is set in a direction indicated by solid lines. Note that the heating operation includes not only heating to be used in the air conditioner 70 but also, for example, hot-water supply in which heat is applied to water to produce hot water. FIG. 13 is a Mollier chart illustrating the state of the refrigerant in the heat pump apparatus 50 according to the second embodiment. In FIG. 13, the horizontal axis represents specific enthalpy, and the vertical axis represents refrigerant pressure.

A gas-phase refrigerant that has reached a high temperature and a high pressure in the compressor 51 (point 1 in FIG. 13) is discharged from the compressor 51 and subjected to heat exchange in the heat exchanger 52 serving as a condenser and a radiator, to be liquefied (point 2 in FIG. 13). At this time, water circulating through the water circuit 63 is warmed by heat radiated from the refrigerant, and is used for heating, hot-water supply, and the like. The liquid-phase refrigerant liquefied in the heat exchanger 52 is decompressed by the expansion mechanism 53 to be in a gas-liquid two-phase state (point 3 in FIG. 13). The refrigerant brought into the gas-liquid two-phase state by the expansion mechanism 53 exchanges heat, in the receiver 54, with a refrigerant to be sucked into the compressor 51, and is cooled to be liquefied (point 4 in FIG. 13). The liquid-phase refrigerant liquefied in the receiver 54 bifurcates and flows through the main refrigerant circuit 58 and the injection circuit 62.

The liquid-phase refrigerant flowing through the main refrigerant circuit 58 exchanges heat, in the internal heat exchanger 55, with the refrigerant flowing through the injection circuit 62 that has been decompressed by the expansion mechanism 61 to be in the gas-liquid two-phase state, and is further cooled (point 5 in FIG. 13). The liquid-phase refrigerant cooled in the internal heat exchanger 55 is decompressed by the expansion mechanism 56 to be in a gas-liquid two-phase state (point 6 in FIG. 13). The refrigerant brought into the gas-liquid two-phase state by the expansion mechanism 56 exchanges heat with outside air in the heat exchanger 57 serving as an evaporator, and is heated (point 7 in FIG. 13). Then, the refrigerant heated by the heat exchanger 57 is further heated by the receiver 54 (point 8 in FIG. 13), and is sucked into the compressor 51.

Meanwhile, the refrigerant flowing through the injection circuit 62 is decompressed by the expansion mechanism 61 as described above (point 9 in FIG. 13) and subjected to heat exchange in the internal heat exchanger 55 (point 10 in FIG. 13). An injection refrigerant, which is the refrigerant in the gas-liquid two-phase state subjected to the heat exchange in the internal heat exchanger 55, flows into the compressor 51 from the injection pipe of the compressor 51 while being kept in the gas-liquid two-phase state. In the compressor 51, the refrigerant sucked from the main refrigerant circuit 58 (point 8 in FIG. 13) is compressed to an intermediate pressure and heated (point 11 in FIG. 13). The refrigerant compressed to the intermediate pressure and heated (point 11 in FIG. 13) joins the injection refrigerant (point 10 in FIG. 13), and decreases in temperature (point 12 in FIG. 13). Then, the refrigerant having decreased in temperature (point 12 in FIG. 13) is further compressed and heated to reach a high pressure and a high temperature, and is discharged (point 1 in FIG. 13).

Note that when injection operation is not performed, the opening degree of the expansion mechanism 61 is fully closed. That is, the opening degree of the expansion mechanism 61 is larger than a prescribed opening degree when the injection operation is performed, but the opening degree of the expansion mechanism 61 is made smaller than the prescribed opening degree when the injection operation is not performed. As a result, the refrigerant does not flow into the injection pipe of the compressor 51. Here, the opening degree of the expansion mechanism 61 may be electronically controlled by the control unit 43 such as a microcomputer.

Next, how the heat pump apparatus 50 works during cooling operation will be described. During the cooling operation, the four-way valve 59 is set in a direction indicated by broken lines. Note that the cooling operation includes not only cooling to be used in the air conditioner 70 but also taking heat from water to produce cold water, freezing, and the like.

A gas-phase refrigerant that has reached a high temperature and a high pressure in the compressor 51 (point 1 in FIG. 13) is discharged from the compressor 51 and subjected to heat exchange in the heat exchanger 57 serving as a condenser and a radiator, to be liquefied (point 2 in FIG. 13). The liquid-phase refrigerant liquefied in the heat exchanger 57 is decompressed by the expansion mechanism 56 to be in a gas-liquid two-phase state (point 3 in FIG. 13). The refrigerant brought into the gas-liquid two-phase state by the expansion mechanism 56 is subjected to heat exchange in the internal heat exchanger 55, and is cooled to be liquefied (point 4 in FIG. 13). The internal heat exchanger 55 causes the refrigerant brought into the gas-liquid two-phase state by the expansion mechanism 56 to exchange heat with a refrigerant resulting from the liquid-phase refrigerant liquefied in the internal heat exchanger 55 and then decompressed by the expansion mechanism 61 to be in a gas-liquid two-phase state (point 9 in FIG. 13). The liquid-phase refrigerant (point 4 in FIG. 13) subjected to the heat exchange in the internal heat exchanger 55 bifurcates and flows through the main refrigerant circuit 58 and the injection circuit 62.

The liquid-phase refrigerant flowing through the main refrigerant circuit 58 exchanges heat, in the receiver 54, with a refrigerant to be sucked into the compressor 51, and is further cooled (point 5 in FIG. 13). The liquid-phase refrigerant cooled in the receiver 54 is decompressed by the expansion mechanism 53 to be in a gas-liquid two-phase state (point 6 in FIG. 13). The refrigerant brought into the gas-liquid two-phase state by the expansion mechanism 53 is subjected to heat exchange in the heat exchanger 52 serving as an evaporator, and is heated (point 7 in FIG. 13). At this time, as the refrigerant absorbs heat, water circulating through the water circuit 63 is cooled and used for cooling, freezing, and the like. Then, the refrigerant heated in the heat exchanger 52 is further heated in the receiver 54 (point 8 in FIG. 13), and is sucked into the compressor 51.

Meanwhile, the refrigerant flowing through the injection circuit 62 is decompressed by the expansion mechanism 61 as described above (point 9 in FIG. 13) and subjected to heat exchange in the internal heat exchanger 55 (point 10 in FIG. 13). An injection refrigerant, which is the refrigerant in the gas-liquid two-phase state subjected to the heat exchange in the internal heat exchanger 55, flows into the compressor 51 from the injection pipe of the compressor 51 while being kept in the gas-liquid two-phase state. Compression operation in the compressor 51 is similar to that to be performed during the heating operation.

Note that, as in the heating operation, when the injection operation is not performed, the opening degree of the expansion mechanism 61 is fully closed so that the refrigerant does not flow into the injection pipe of the compressor 51. Furthermore, the heat exchanger 52 has been described above as a heat exchanger such as a plate-type heat exchanger that causes the refrigerant to exchange heat with water circulating through the water circuit 63. The heat exchanger 52 is not limited thereto, and may be a heat exchanger that causes the refrigerant to exchange heat with air. In addition, the water circuit 63 need not be a circuit through which water circulates, but may be a circuit through which another fluid circulates.

Here, in order to reduce the charging and discharging current of the capacitor 33, power to be consumed by the load 40 just needs to be pulsated. In the heat pump apparatus 50, most of power is consumed by the compressor 51. The compressor 51 includes the motor 44 and a compression mechanism, and power consumption is mainly due to the product of torque generated in the motor 44 and an angular frequency of the motor 44. Therefore, the heat pump apparatus 50 can reduce the charging and discharging current of the capacitor 33 by changing the torque of the motor 44 or the angular frequency that is a rotational frequency. That is, in the power converting apparatus 100, the control unit 45 causes power pulsation in power to be consumed by the load 40 by changing torque to be output to the motor 44 or a rotation speed of the motor 44.

The torque of the motor 44 can be implemented by use of control for making the torque variable during rotation, which is a well-known technique. Specifically, it is possible to implement the heat pump apparatus 50 by decomposing current flowing through the motor 44 into a d-axis current that is an excitation component and a q-axis current that is a torque component, and controlling the q-axis current. Furthermore, it is possible to implement the heat pump apparatus 50 by generating, with regard to the angular frequency of the motor, a command value for the q-axis current from a speed command value of the motor 44 and a speed detection value or estimation value.

Furthermore, when the compressor 51 has load torque pulsation during one rotation as with a rotary compressor, the heat pump apparatus 50 may make the angular frequency, the output torque of the motor 44, and the like variable so as to reduce the charging and discharging current of the capacitor 33 in accordance with fluctuation in load torque. In addition, needless to say, the heat pump apparatus 50 may make the load torque to be applied to the compressor 51 variable by adjusting the opening degree of the expansion mechanism 61, or may make the load torque variable by other methods.

As described above, the heat pump apparatus 50 can be used not only for the air conditioner 70 but also for a heat pump apparatus using an inverter compressor, such as a heat pump water heater, a refrigerator, or a refrigeration machine.

Application of the power converting apparatus 100 to the heat pump apparatus 50 has been described. Meanwhile, the power converting apparatus 100 can be applied to any apparatus as long as the apparatus rectifies alternating-current power from the alternating-current power supply 10, stores the alternating-current power in the capacitor 33, and supplies the alternating-current power to the load 40. The power converting apparatus 100 can be applied not only to household appliances such as a blower, an electric washing machine, an induction heating (IH) cooking heater, a vacuum cleaner, and lighting, but also to devices such as an electric vehicle and a power conditioner.

The configurations set forth in the above embodiments show examples, and it is possible to combine the configurations with another known technique or combine the embodiments with each other, and is also possible to partially omit or change the configurations without departing from the scope of the present disclosure.

The invention claimed is:

1. A power converting apparatus comprising:

a rectifier that rectifies alternating-current power output by an alternating-current power supply;

a capacitor provided at an output end of the rectifier;

a reactor provided on a path from the alternating-current power supply to the capacitor;

a load connected across the capacitor, wherein power output by the load comprises an alternating-current component and a direct-current component; and a controller that reduces a charging and discharging current of the capacitor by controlling an operation state of the load such that power pulsation is caused in power to be consumed by the load, power pulsation in power to be consumed by the load being characterized by the alternating-current component of the power output by the load, wherein a range of an inductance value of the reactor to enable reducing the charging and discharging current of the capacitor is defined by using a maximum value of an output voltage of the rectifier, a minimum value of the output voltage of the rectifier, the direct-current component of the power output by the load, a number of phases of the alternating-current power supply, and an angular frequency of the alternating-current power supply, the range of the inductance value of the reactor is further defined by use of a pulsating quantity and a ripple tolerance of the capacitor, the pulsating quantity corresponding to a ripple current of the capacitor to be obtained when the output power of the load is not pulsated, the inductance value of the reactor is expressed by following formulas:

17
18

$$L = \frac{V_{max}^2 - V_{min}^2}{4P_{out\_dc}} \frac{\alpha\beta}{(2P)\omega} \qquad \text{Formula 1}$$

and $$\frac{I_{r0} - I_{r\_lim}}{I_{r0}} \leq \alpha\beta \leq 10 \qquad \text{Formula 2}$$

where L is the inductance value of the reactor, $V_{max}$ is the maximum value of the output voltage of the rectifier, $V_{min}$ is the minimum value of the output voltage of the rectifier, $P_{out\_dc}$ is the direct-current component of the output power of the load, P is the number of phases of the alternating-current power supply, $\omega$ is the angular frequency of the alternating-current power supply, $I_{r^0}$ is a ripple current value of the capacitor corresponding to the pulsating quantity to be obtained when the output power of the load is not pulsated, $I_{r\_lim}$ is the ripple tolerance of the capacitor, and $\alpha\beta$ is a coefficient based on a load pulsation allowable value and the ripple tolerance of the capacitor.

2. The power converting apparatus according to claim 1, wherein an alternating-current component of the output power of the load corresponding to a pulsating quantity of the power pulsation is equal to or less than a value of $P_{out\_ac}$ expressed by a following formula:

$$P_{out\_ac} = \frac{V_{max}^2 - V_{min}^2}{4L} \frac{\sin\{(2P)\omega t\}}{(2P)\omega} \qquad \text{Formula 3}$$

where $P_{out\_ac}$ is the alternating-current component of the output power of the load.

3. The power converting apparatus according to claim 1, wherein the load includes an inverter and a motor, and the controller causes the power pulsation by changing torque to be output to the motor or a rotation speed of the motor.

4. A heat pump apparatus comprising the power converting apparatus according to claim 1.

5. An air conditioner comprising the heat pump apparatus according to claim 4.

\* \* \* \* \*